United States Patent [19]
Howard

[11] Patent Number: 5,444,983
[45] Date of Patent: Aug. 29, 1995

[54] MAGNETIC HEAT PUMP FLOW DIRECTOR

[75] Inventor: Frank S. Howard, Indian Harbour Beach, Fla.

[73] Assignee: The United States of America as represented by the Administrator of the National Aeronautics and Space Administration, Washington, D.C.

[21] Appl. No.: 203,093
[22] Filed: Feb. 28, 1994
[51] Int. Cl.$^6$ .................................. F25B 21/02
[52] U.S. Cl. .......................... 62/3.1; 62/3.3
[58] Field of Search .................... 62/3.1, 3.3

[56] References Cited

U.S. PATENT DOCUMENTS

| | | | |
|---|---|---|---|
| 2,438,945 | 4/1948 | Rhodes | 132/163 X |
| 3,108,444 | 10/1963 | Kahn | 62/3.1 |
| 3,743,866 | 7/1973 | Pirc | 62/3.1 |
| 4,033,734 | 7/1977 | Steyert, Jr. et al. | 62/3.1 |
| 4,107,935 | 8/1978 | Steyert, Jr. | 62/3.1 |
| 4,408,463 | 10/1983 | Barclay | 62/3.1 |
| 4,441,325 | 4/1984 | Bon-Mardion et al. | 62/3.1 |
| 4,507,927 | 4/1985 | Barclay | 62/3.1 X |
| 4,642,994 | 2/1987 | Barclay et al. | 62/3.3 |
| 4,702,090 | 10/1987 | Barclay et al. | 62/3.3 |
| 4,727,721 | 3/1988 | Peschka et al. | 62/3.1 |
| 4,727,722 | 3/1988 | Kirol | 62/3.1 |
| 4,785,636 | 11/1988 | Hakuraku et al. | 62/3.3 |
| 5,091,361 | 2/1992 | Hed | 62/3.3 |

OTHER PUBLICATIONS

Barclay, J. A.; "Use of a ferrofluid as the heat exchange fluid in a magnetic refrigerator"; J. Appl. Phys. 53(4), Apr. 1982 pp. 2887–2894.

*Primary Examiner*—Christopher Kilner
*Attorney, Agent, or Firm*—William J. Sheehan; Guy M. Miller; Alan J. Kennedy

[57] ABSTRACT

A fluid flow director is disclosed. The director comprises a handle body and combed-teeth extending from one side of the body. The body can be formed of a clear plastic such as acrylic. The director can be used with heat exchangers such as a magnetic heat pump and can minimize the undesired mixing of fluid flows. The types of heat exchangers can encompass both heat pumps and refrigerators. The director can adjust the fluid flow of liquid or gas along desired flow directions. A method of applying the flow director within a magnetic heat pump application is also disclosed where the comb-teeth portions of the director are inserted into the fluid flow paths of the heat pump.

3 Claims, 3 Drawing Sheets

MAGNETIC HEAT PUMP FLOW DIRECTOR

This invention relates to controlling the fluid flow direction in a heat exchanger, and in particular to a flow director for a magnetic heat pump. The invention described herein was made by an employee of the United States Government and may be manufactured and used by or for the Government of the United States of America for Governmental purposes without the payment of any royalties thereon or therefor.

BACKGROUND AND PRIOR ART

Refrigeration and space heating systems used in industry and for domestic use have relied on Freon gas-cycles. Research has shown that the release of Freon into the atmosphere deteriorates the ozone layer in the Earth's atmosphere. The ozone layer is a protective layer that shields the earth from ultraviolet rays. The resultant harmful effects from an increase in ultraviolet rays can cause serious problems such as higher incidences of skin cancer. As a result, magnetic heat pump technology has been developed as an alternative to the use of Freon gas-cycle to provide refrigeration and space heating. The magnetic heat pump has the potential of being more efficient than a compressor driven refrigerator by using less power for the same amount of cooling.

A magnetic heat pump consists of a rotor of magnetic material such as gadolinium, which slowly rotates through a magnetic field formed from magnets. The type of magnets used can depend on the degree of cooling desired. For greater cooling, a super conductor magnet may be used. For lesser cooling, a permanent magnet with a weaker magnetic field may be used. The rotor has an enclosure with flow passages to allow heat transfer fluid to move through the rotor. The control of fluid flow direction through the rotor is difficult because the fluid has to flow into, through the material, and out of the material in one direction as the material is moved in the opposite direction.

FIG. 1 illustrates a flow schematic of the fluid flow area in a magnetic heat pump 100 without flow directors. The magnetic heat pump 100 consists of a rotor 5 of magnetic material which slowly rotates through a magnetic field 102 which has been formed from a magnet. The rotor 5 has an enclosure with flow passages 12 to allow heat transfer fluid to move through the rotor 5. The magnetic material 5, such as the rare earth metal gadolinium, may be in small spheres, chunks, discs plates, or any shape that would allow fluid to flow through it. In FIG. 1, rotor 5 was constructed of flat parallel discs of working material with a very small space in between each disc pair. The curie point temperature of the magnetic material 5 is the same as the temperature of the fluid passing through it. FIG. 5a illustrates magnetic material 5 in the form of stacked disc plates with the space 12 in between the disc plates for allowing fluid flow. FIG. 1 shows the fluid flow in the space 12 between two of the disc plates 5.

In FIG. 1, as the magnetic material passes through the point 30 to point 40, the electrons in the material 5 align themselves in the same direction and heat up. As the magnetic material 5 moves out of the magnetic field 102 from 40 to 30, the material 5 cools. The rotor 5 moves in a housing with ports 10, 20, 30, and 40, for fluid to enter and exit the system as shown in FIG. 1. The rotor 5 rotates in the direction of arrow A. The ideal flow path for the fluid is input into the flow passage 12 at 10 and 30, and output at 20 and 40. In the passage area from 10 to 20, the fluid flow as represented by arrow B1 is cooled down by the magnetic material 5 which has been removed from the magnetic field 102. As the fluid flows through the passage from 30 to 40, the fluid is warmed by the magnetic material 5. As the fluid flows in the passage from 40 to 10, the fluid is pumped by pump 15 through a heat exchanger 17 which cools the fluid to complete the heat pump cycle. The basic problem is the splitting of the flow path. As cold fluid enters the passage at 10, some fluid passes along the passage to 40 as represented by arrow C2 and mixes with warm fluid coming from the magnetic field 102. As fluid enters the heat exchanger 27, some of the cold fluid bypasses the heat exchanger 27 to flow instead along arrow C1 to the magnetic field 102. This fluid is heated up without getting to cool at the heat exchanger 27. Thus, fluid flow along arrow C1 mixes with fluid entering at point 30. Likewise fluid flow along arrow C2 mixes with the fluid of arrow B2. The split flows which occur at points 10 and 30 that cause fluid mixing significantly decreases the efficiency of the heat pump.

Prior art solutions to redirect fluid flow through a moving wheel in a magnetic heat pump appear to have utilized seals in the wheels or housings and/or segmented wheels to accomplish the pumping of heat transfer fluid through the rotating working materials. For example U.S. Pat. No. 4,107,935 which is incorporated by reference shows such a system where a rotary magnetic refrigerator uses a wheel segmented into spaces through which heat transfer fluid flows radially in the segments, back and forth. This patent appears to require a complex design for a segmented wheel that could limit the practical usability of the device. Thus, the inventor is not aware of any method of adequately directing the fluid flow in heat pumps.

SUMMARY OF THE INVENTION

The magnetic heat flow direction control was accomplished by using magnetic material machined in disc shaped plates. Flow directors are placed in fixed positions around the magnetic rotor. The flow director blocks the flow forcing the flow in another direction. The flow directors are made by machining comb shaped pieces. The teeth of the pieces fit between the plates of magnetic material. The plates of the magnetic material rotate and move between the stationary teeth of the flow director. This enables the desired relative flow direction of fluid and magnetic material.

The system demands that fluid flowing in and out of the housing, containing the rotating rotors, must follow two separated loops without mixing. The difficulty occurs trying to separate fluid into two loops within the same housing without being mixed. By installing a flow director, a comb shaped piece fitted between the thin rotor plates at the loop separation point, enough restriction would be developed by the comb shaped pieces to properly direct the fluid flow. Darcy's equation indicates that introducing the flow director provides adequate resistance to guide the fluid flow through correct directions with very little mixing.

The first objective of the present invention is to provide a flow director for a magnetic heat pump that allows for fluid loop flow through correct directions with a minor amount of mixing.

A second objective of the present invention is to provide a director for controlling the direction of fluid flow through the magnetic material in the magnetic heat pump.

A third objective is to provide a flow director that can increase the operating efficiency of magnetic heat pumps.

Further objects and advantages of this invention will be apparent from the following detailed description of a presently preferred embodiment which is illustrated schematically in the accompanying drawings.

BRIEF DESCRIPTION OF THE FIGURES

FIG. 5b shows a cutaway view of the location of the flow director in FIG. 5a.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
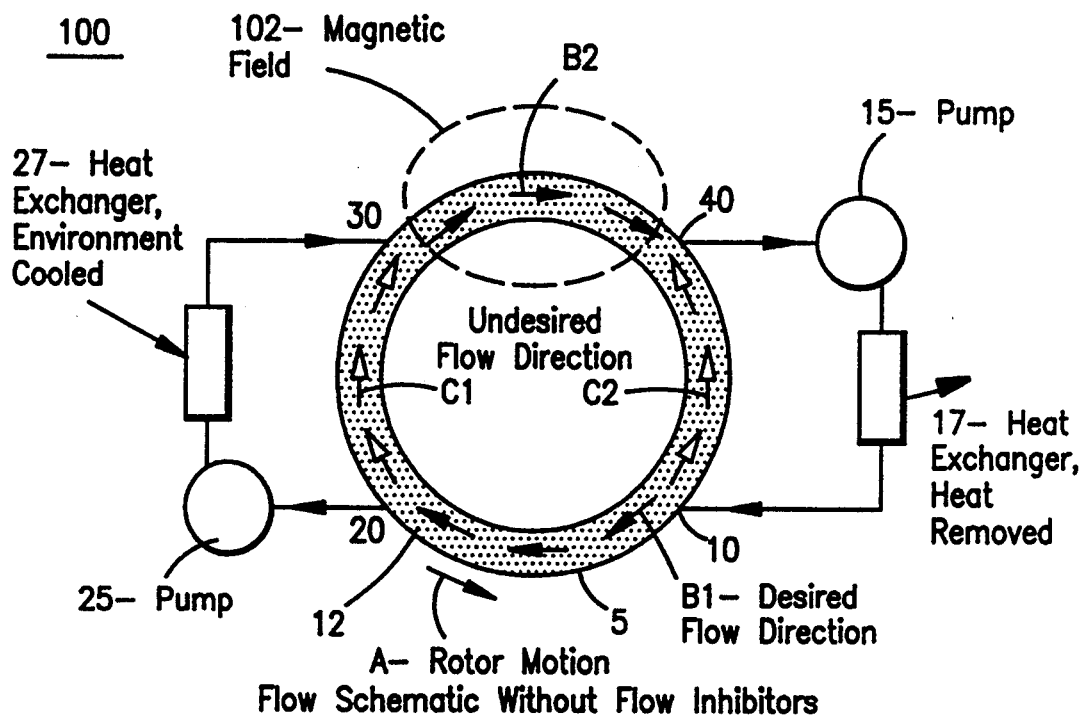
FIG. 1 illustrates a Flow Schematic of a magnetic heat pump without Flow Directors.
Figure 2:
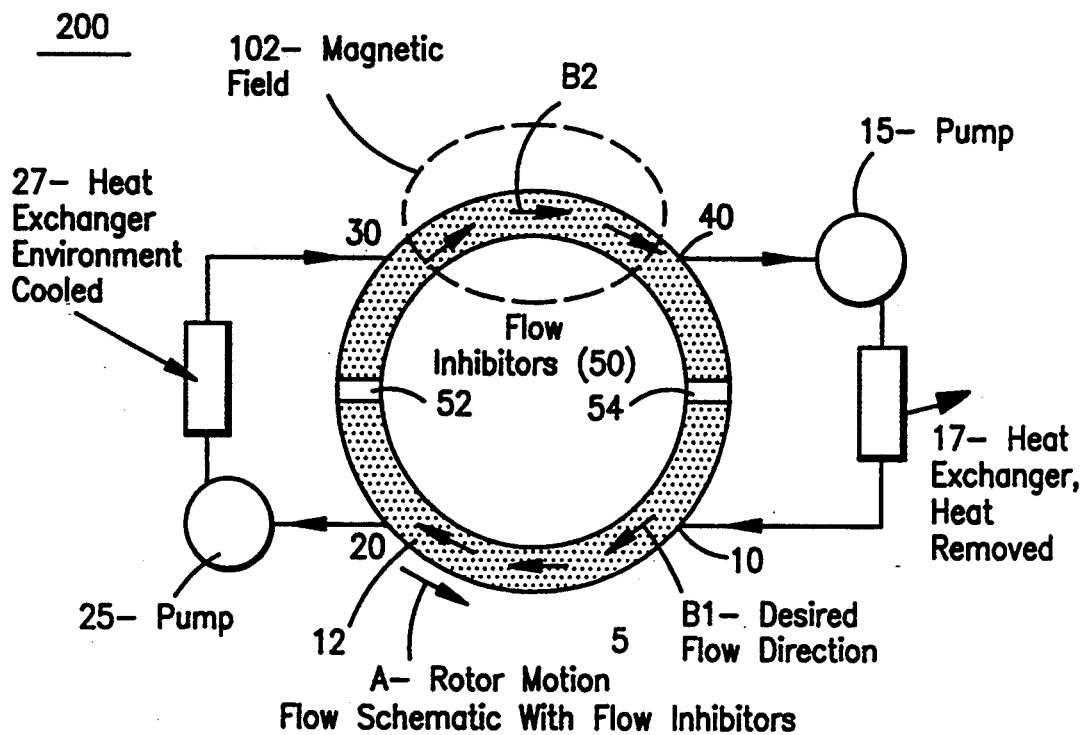
FIG. 2 shows a Flow Schematic of the magnetic heat pump of FIG. 1 with Flow directors.

A discussion of the invention will now follow. FIG. 2 shows a Flow Schematic 200 of the magnetic heat pump of FIG. 1 with Flow directors 52 and 54. Flow director 52 causes substantially all the fluid from flow B1 to pass through output point 20 and not to flow directly along the passage to point 30. Likewise flow director 54 does not allow fluid entering from point 10 to mix with output 40. Thus, the undesired flow directions as represented by arrows C1 and C2 in the first figure are not apparent. Flow directors 52 and 54 greatly reduce the mixing that takes place with the split flow of the prior art. Due to the installation of a flow director (comb-shaped barrier) between 10 and 40, the flow resistance between 10 and 20 is much less than between 10 and 40. Thus, most fluid entering at 10 flows to 20 which is the proper direction.

Figure 3:
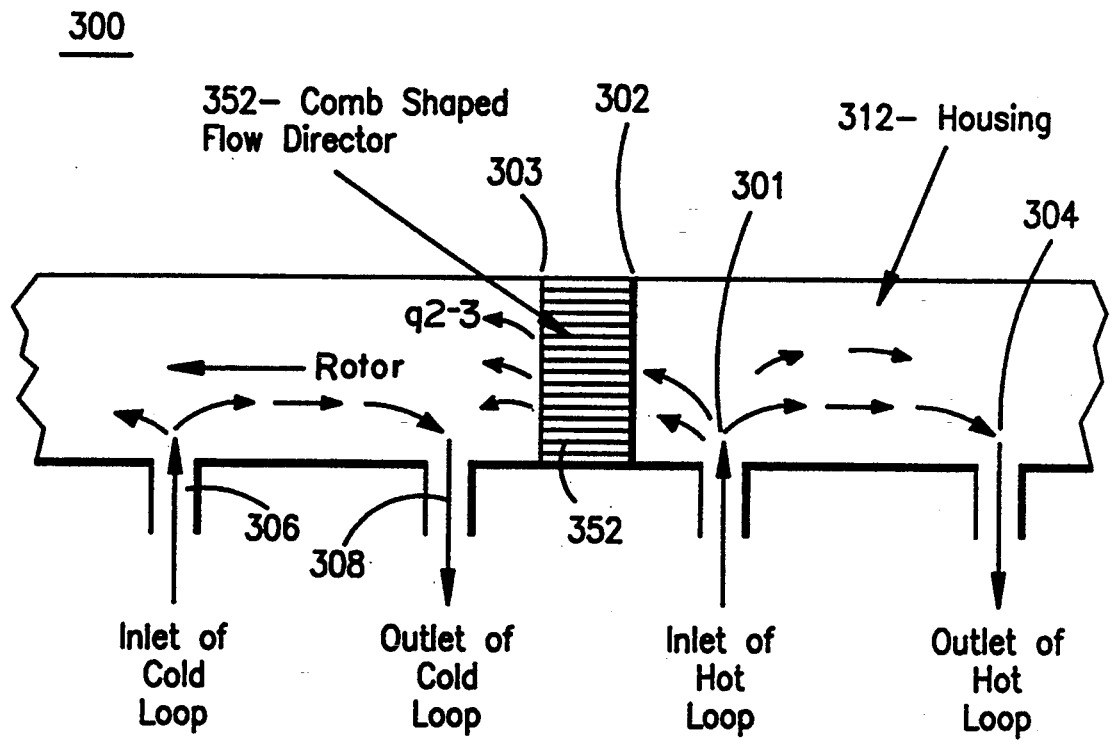
FIG. 3 shows a schematic for flow director position and loop separation.

FIG. 3 shows a schematic 300 for flow director position and loop separation. Fluid entering the housing passage 312 at point 301 is free to flow through the rotor in either direction to 302 and 304. If there is no barrier at 302, fluid will flow from 302 to 303 and mix with fluid flow from the other loop of 306 to 308. Due to the installation of flow director 352 between points 302 and 303, fluid flow resistance between 301 and 302 is much less than between 302 and 303. Thus, most fluid entering at 301 flows to 304 which is the desired flow direction. Calculations indicated that the pressure difference between points 302 and 303 is much greater than between 301 and 302. Most of the fluid entering at 301 flows to the exit port at 304. There are some trace of fluid flow across the flow director from point 302 to 303 and mix with the adjacent loop, but the quantity was calculated to be very small (approximately $6.63 \times 10^{-5}$ ft$^3$/s/port).

Calculations were made using the Darcy formula for laminar flow with other equations that can be found in Engineering Division, Crane Co. "Flow of Fluids through Valves, Fittings, and Pipe," Technical Paper No. 410, Crane Co., New York, 1979, pp 3-1, 3-5. The equations will determine the fluid pressure drop between section 302 and 303 in FIG. 3, which will be compared to the fluid pressure drop between section 301 and 302 in FIG. 3 to illustrate the control that occurs from using a flow director.

$$h_L = \frac{fL}{D} \frac{v^2}{2g} \quad (1)$$

Where:
$h_L$ is fluid flow pressure drop between two points in ft.
f is the friction factor for the flow which is dimensionless
L is the length of passage in feet (ft)
D is the diameter if the passage in feet (ft)
v is the velocity of the fluid in feet per second (ft/sec)
g is the acceleration of gravity, 32.2 feet per second square (ft/sec sq)

The flow of the fluid is slow enough to be a laminar flow where:

$$f = Re/64 \quad (2)$$

Where:
Re is the Reynolds number which is dimensionless $$Re = Dvr/\mu \quad (3)$$

Where:
r is the density of the fluid in pounds per cubic feet (lb/cu ft)
$\mu$ is the viscosity of the fluid in pound per foot second (lb/ft/sec)

From the continuity equation:

$$v = q/A \quad (4)$$

Where:
v is the velocity of the fluid in feet per second (ft/sec)
q is the flow rate in cubic feet per second (cu ft/sec)
A is the flow area in square feet (sq ft)

Using a circular cross sectional area:

$$A = \frac{\pi D^2}{4} \quad (5)$$

Substituting the continuity equation (4) and the flow area equation (5) into the Darcy equation (1) yields:

$$h_L = \frac{fL}{2gD} \frac{q^2}{A^2} = \frac{8fL q^2}{g\pi^2 D^5} \quad (6)$$

From this equation, it can be seen that the pressure difference between two points is inversely proportional to the diameter to the fifth power.

$$h_L \propto 1/D^5 \quad (7)$$

Since radius equals one half the diameter the radius is directly proportional to the diameter.

$$r = D/2 \quad (8)$$

$$r \propto D \quad (9)$$

Therefore the pressure difference between two points is inversely proportional to the radius to the fifth power:

$$h_L \propto 1/r^5 \quad (10)$$

When flow is calculated through a non-circular flow area like a pipe, the hydraulic radius is used. Given equal flow velocities through the flow director in section 302 and through the magnetic plates in section 301, the ratio of pressure drop through the flow directors and the magnetic plates were computed by the ratio of the hydraulic radii.

Hydraulic radius (ft)=flow area (sq ft)/wetted perimeter (ft) (11)

Where:
flow area is the cross-sectional area of the fluid flowing through a passage measured in ft$^2$, wetted perimeter is the portion of the perimeter of a fluid passage which is in contact with the fluid measured in feet(ft).

In FIG. 3, given measured values and computations were as follows;
Flow area at section 301 A301=3.13×10$^{-3}$ ft$^2$
Flow area at section 302 A302=1.70×10$^{-4}$ ft$^2$
Wetted perimeter at section 301 WP1=0.80 ft
Wetted perimeter at section 302 WP2=0.96 ft
Hydraulic radius at section 301 RH1=3.91×10$^{-3}$ ft
Hydraulic radius at section 302 RH2=1.77×10$^{-4}$ ft The ratio of the fluid flow pressure drop through the flow director at section 302 to 303, over the fluid flow pressure drop from 301 to 302 which is equal to 301 to 304 is

R=(RH1/RH2)$^5$
R=(3.91×10$^{-3}$/1.77×10$^{-4}$)$^5$=5,201,617

Thus, the fluid flow pressure drop between section 302-303 is substantially greater than that between section 301-304. With such substantial fluid flow pressure drop though the flow director, the flow through the flow director is inhibited, and flow is directed in the other direction through section 312 as desired. For the device being disclosed to work, it was necessary to use a cylinder with slots machined in it to enable passage of the fluid as shown in FIG. 3.

Figures 4A, 4B:
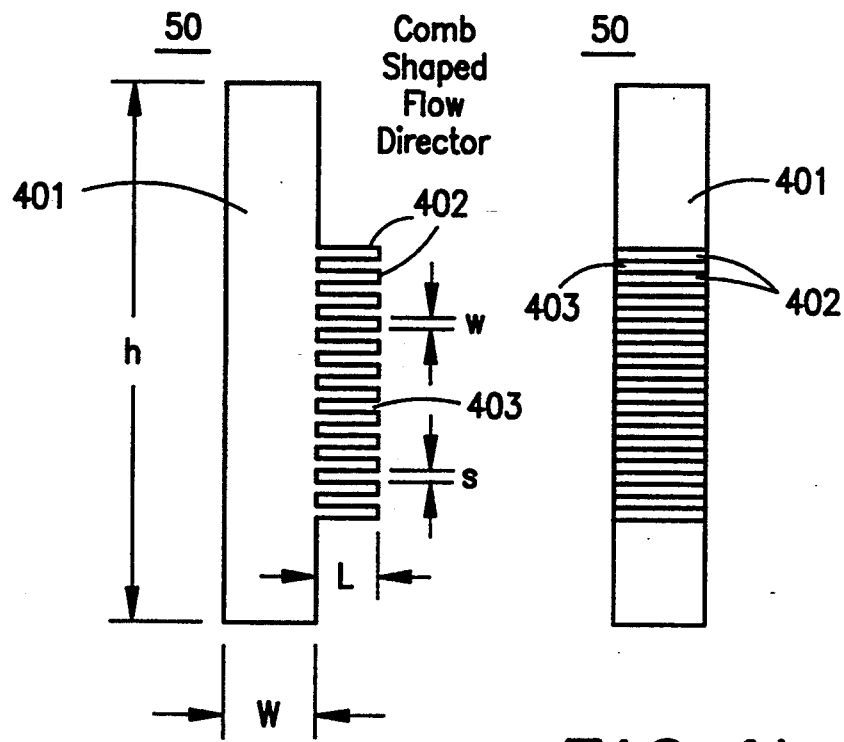
FIG. 4a illustrates a side view of a flow director.
FIG. 4b illustrate a front view of the comb shaped teeth of the flow director of FIG. 4a schematic of the housing assembly.

FIG. 4a illustrates a side view of a flow director 50 used in FIG. 2. Flow director 50 comprises handle body 401 and comb-teeth portions 402 extending from one side thereof. FIG. 4b illustrate a front view of the comb shaped teeth 402 of the flow director 50 of FIG. 4a. The handle body 401 and comb-teeth portions 402 are formed from a nonmagnetic material such as a visually clear plastic acrylic or three-hundred "austenetic" stainless steel, or the like. An examplary flow director was constructed having approximate dimensions that included a height (h) of 2.5 inches, a width (W) of 0.5 inches, depth (d) of 0.5 inches, individual comb-teeth length (L) of 0.333 inches, spacing (s) between each teeth of 0.15 inches, and width of each tooth (w) of 0.10 inches. This flow director was used with a rotor having an approximate diameter of 8.5 inches with disc-plates of less than 0.10 inches thick, with each disc-plate spaced approximately a little more than 0.10 inches apart.

Figure 5A:
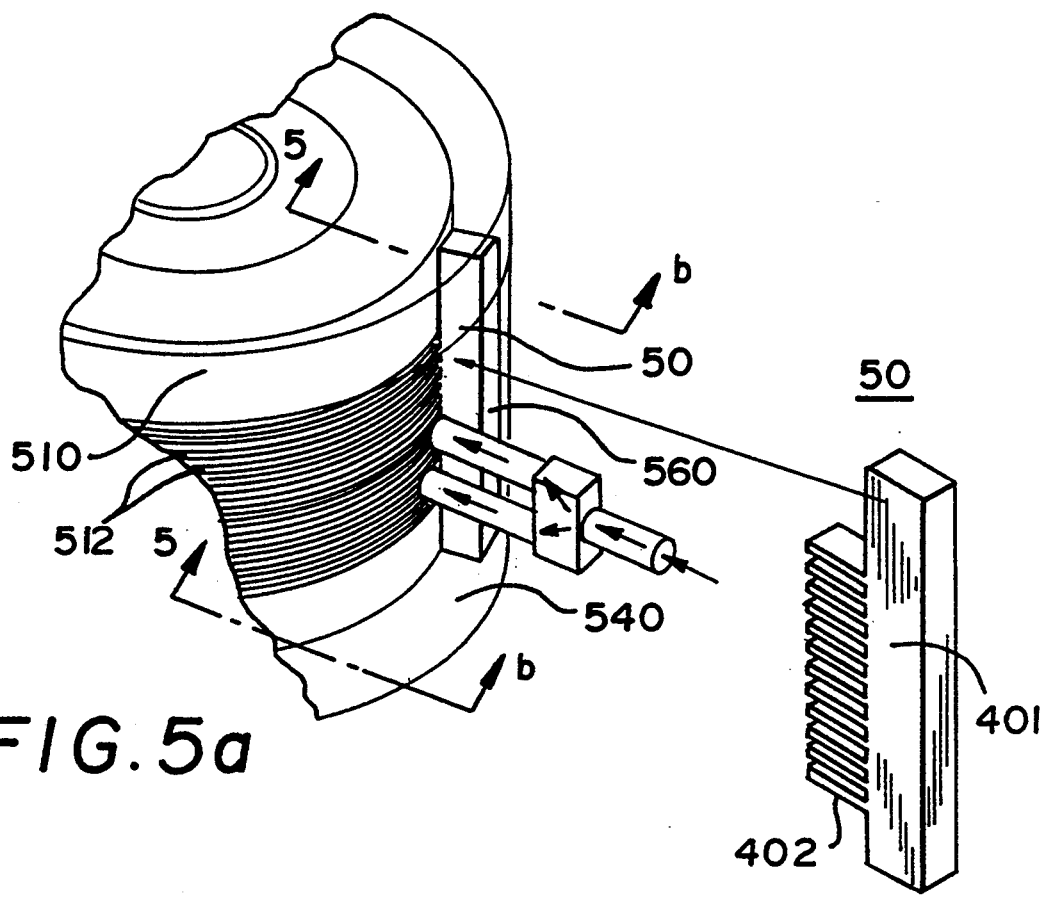
FIG. 5a illustrates an exploded view of where the flow director of FIG. 4a is inserted.
Figure 5B:
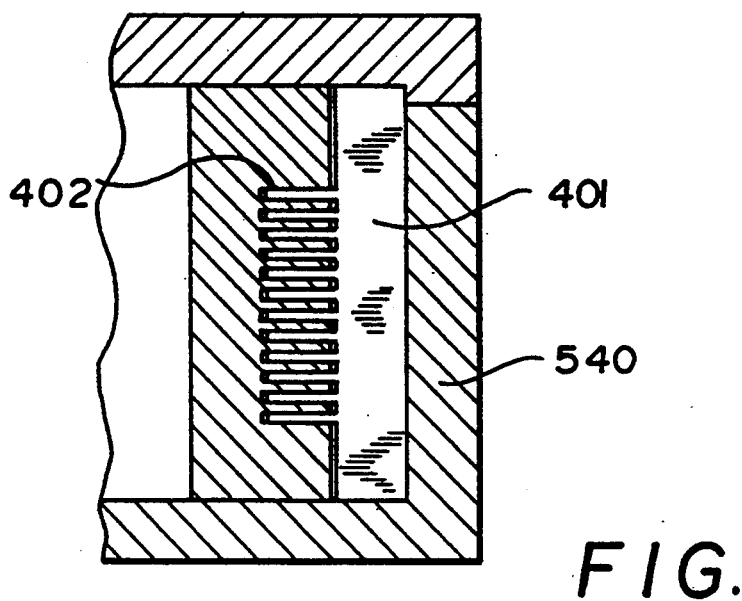

FIG. 5a illustrates an exploded view 500 of where the flow director 50 of FIG. 4a is inserted. The magnetic material rotor 510 has portions machined into cylindrical disc-plates 512. Comb-teeth portions 402 of flow director 50 are inserted in the spaces between disc plates 512 of rotor 510. The peripheral housing 540 has a slot cut in order to hold flow director 50 in place. FIG. 5b shows a cutaway view of the location of the flow director 50 in FIG. 5a. The comb-teeth portions 402 are machined in order to prevent contact between the comb-teeth portions 402 and the disc plates 512. Flow director 50 can be placed at any strategic location about the rotor disc plates 512 FIG. 5a, wherever the need for controlling the fluid flow direction is desired.

The fluid flow directors are meant to be used with all types of heat exchangers. The heat exchangers can encompass both refrigerators and heat pumps. The specific application used for a magnetic heat pump is only for illustrative purposes and the invention is not limited to this type of pump accordingly. The flow directors can be used with various types of liquid such as water and various types of gas such as helium or nitrogen.

The number of flow directors that can be used in a heat exchanger is variable according to the user's needs. Although the preferred embodiment mentions that plastic acrylic to form a flow director, any other type of nonmagnetic material such as three-hundred "austenetic" stainless steel, or the like can also be used.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. In a magnetic heat pump system having a defined magnetic field, a rotor of magnetic material rotating through said magnetic field in a first direction, fluid flow passage within said rotor with heat transfer fluid contained therein, and at least one heat exchange flow path interconnected to said fluid flow passage having defined inlet and outlet ports to cool a portion of said heat transfer fluid as it passes through said system; an improvement consisting of at least one flow director installed in said fluid flow passage between said inlet and outlet ports to divert substantially all of said heat transfer fluid in a second direction opposite said first direction and through said heat exchange flow path, thereby improving the cooling efficiency of said system wherein said rotor consists of a plurality of cylindrical disc plates having spaces between each of said plates to permit passage of said heat transfer fluid.

2. The improvement of claim 1 wherein said flow director has a generally comb teeth body which contiguously mates with said spaces to restrict the flow of heat transfer fluid through that portion of the fluid flow passage thereby diverting said transfer fluid through said heat exchange flow path.

3. The improvement of claim 2 wherein said flow director is formed of clear acrylic.

* * * * *